United States Patent [19]

Bayer et al.

[11] Patent Number: 5,439,330
[45] Date of Patent: Aug. 8, 1995

[54] ANCHOR AND METHOD AND SYSTEM FOR SECURING SAME

[75] Inventors: Jeffrey A. Bayer, Dallas; James A. Lee, Garland, both of Tex.

[73] Assignee: Stone Anchors, Inc., Dallas, Tex.

[21] Appl. No.: 228,967

[22] Filed: Apr. 18, 1994

Related U.S. Application Data

[62] Division of Ser. No. 54,820, Apr. 26, 1993.

[51] Int. Cl.⁶ .............................................. B23B 35/00
[52] U.S. Cl. .................................... 408/1 R; 175/57; 175/263; 408/22; 409/131; 451/57
[58] Field of Search .................... 408/1 R, 22, 83; 409/131, 179; 175/57, 263; 51/283 R, 326, 327; 451/41, 57

[56] References Cited

U.S. PATENT DOCUMENTS

| | | | |
|---|---|---|---|
| 4,010,807 | 3/1977 | Fischer | 408/83 |
| 4,020,610 | 5/1977 | Alexander | 52/511 |
| 4,154,311 | 5/1979 | Fischer et al. | 175/57 |
| 4,800,686 | 1/1989 | Hirabayashi et al. | 408/1 R |
| 4,838,742 | 6/1989 | Fricker | 409/179 |
| 4,929,127 | 5/1990 | Fischer | 408/83 |
| 5,127,777 | 7/1992 | Fischer et al. | 408/236 |
| 5,173,013 | 12/1992 | Gorse et al. | 408/22 |
| 5,226,763 | 7/1993 | Lind | 408/236 |
| 5,316,419 | 5/1994 | Bohnet et al. | 408/236 |

FOREIGN PATENT DOCUMENTS 656603  1/1963  Canada .................. 408/1 R

*Primary Examiner*—Steven C. Bishop
*Attorney, Agent, or Firm*—Baker & Botts

[57] ABSTRACT

A method and system for securing an anchor in a hard substance or rigid material include a cutter bit for drilling a hole in the hard substance, an anchor for fitting within the drilled hole, the process of drilling the hole using the cutter bit, the drilling machine for using the cutter bit, and the resulting improved hard substance or rigid material that may be used as a curtain wall for fastening to a building or similar structure. The hard substance may be a sheet of granite, marble, glass, limestone, or other similar material. The invention includes an anchor that has a cylindrical shaft, a bevelled head portion, and an expanding collar for fitting within and securing the anchor in a drilled hole of the hard substance. The drilled hole includes a bevelled bottom portion that receives the bevelled head portion of the anchor and the expanding collar. A placement device transmits an impacting force to place the expanding collar around the bevelled head portion of the anchor. This secures the anchor in the drilled hole in a time-saving and highly reliable manner.

4 Claims, 3 Drawing Sheets

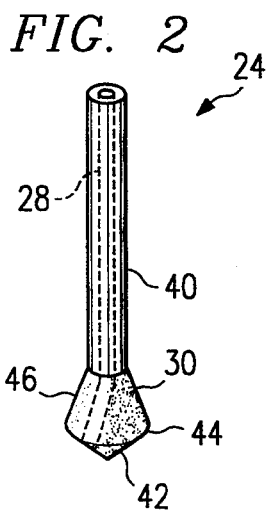
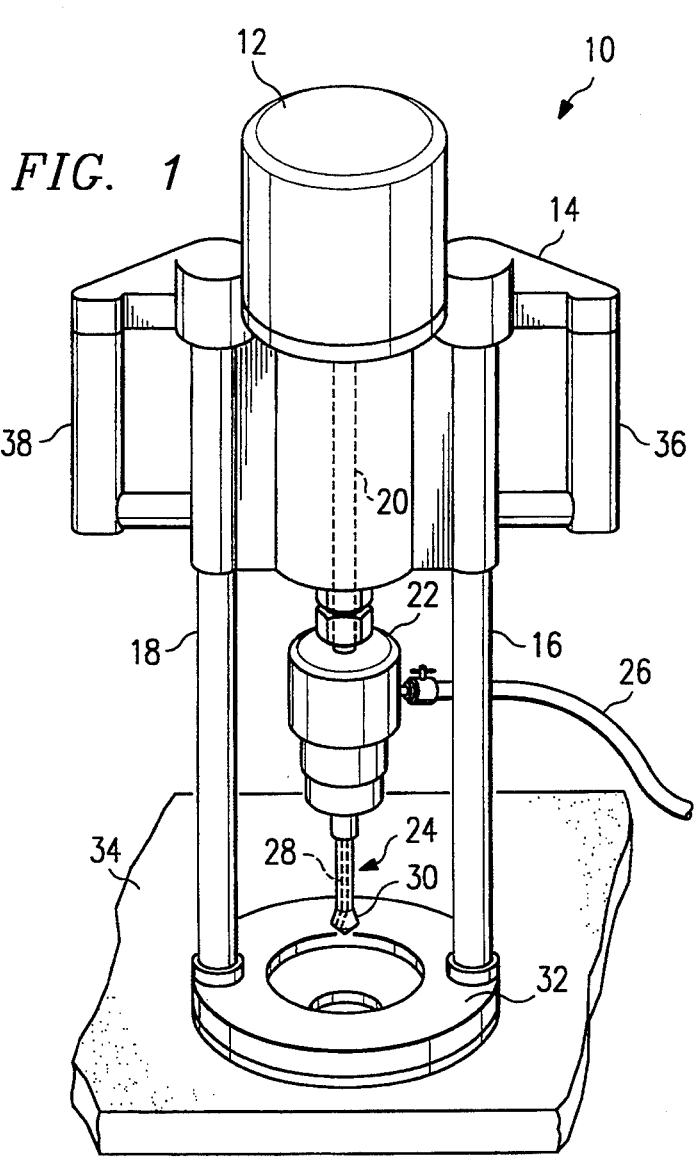
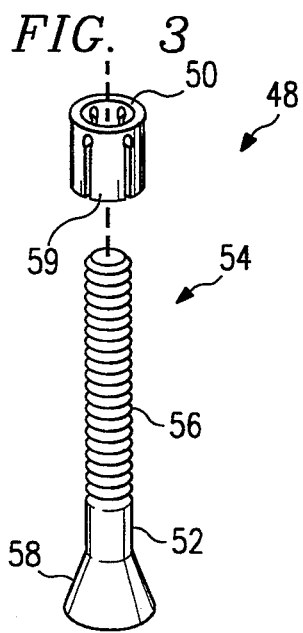
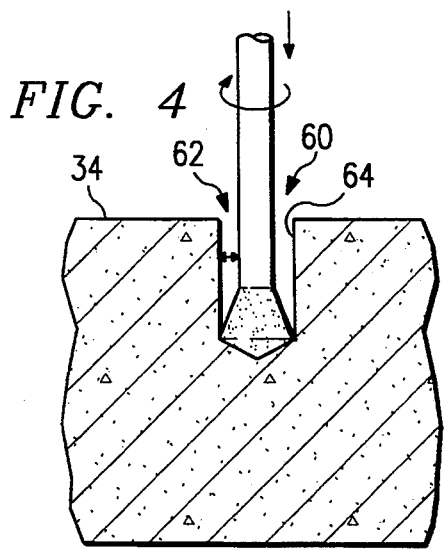
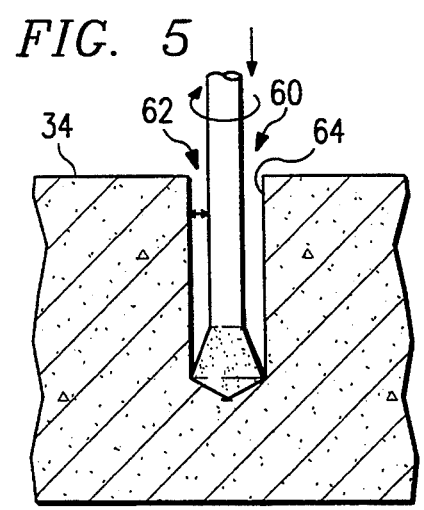

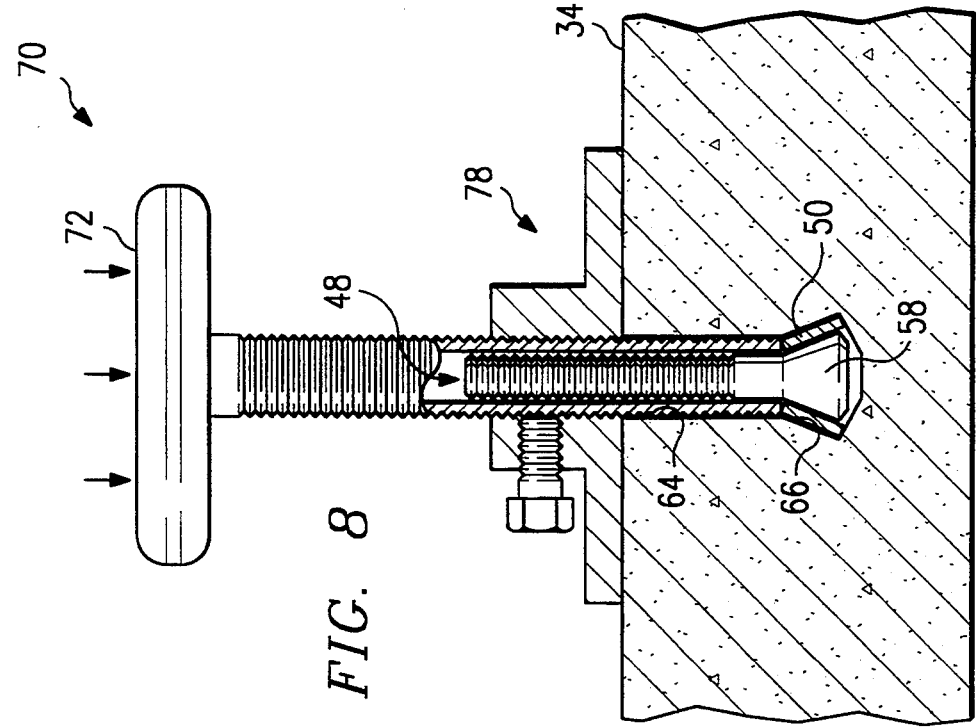
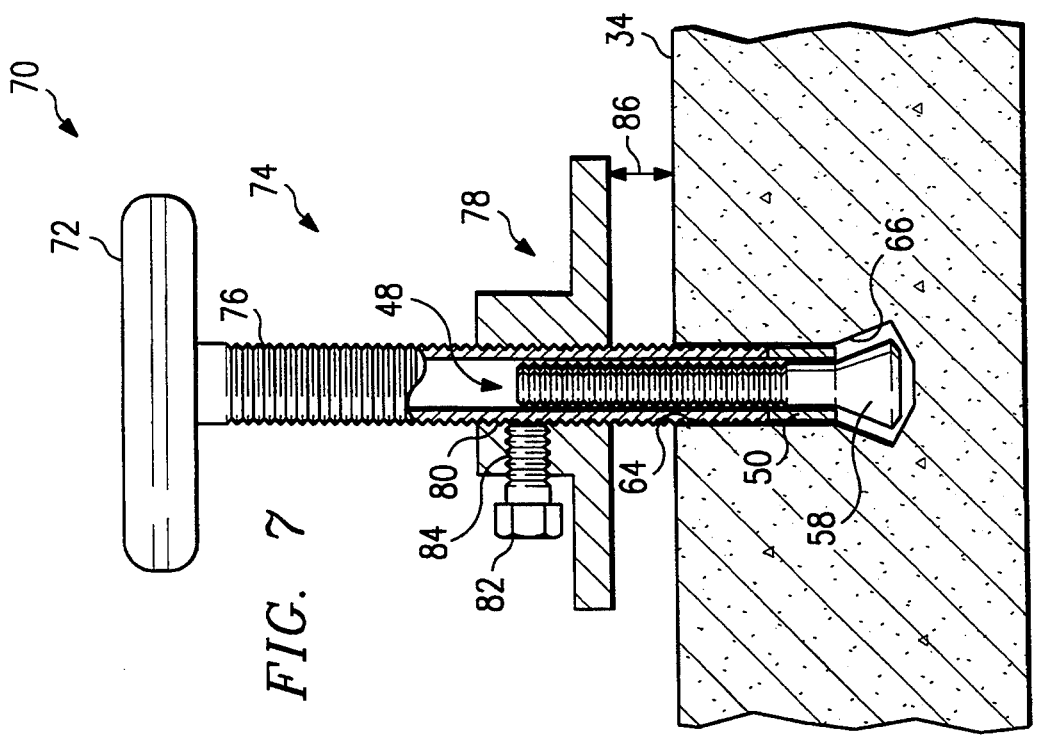

ANCHOR AND METHOD AND SYSTEM FOR SECURING SAME

CROSS REFERENCE TO RELATED APPLICATIONS

This application is a divisional application of U.S. application Ser. No. 08/054,820, filed Apr. 26, 1993 and entitled "Anchor and Method and System For Securing Same", pending.

TECHNICAL FIELD OF THE INVENTION

The present invention generally relates to the field of building construction and, more particularly, to a method and system for securing an anchor in a hard substance or rigid material such as granite, marble, glass, or other materials that may be used for a variety of purposes, including as a curtain wall on a building.

BACKGROUND OF THE INVENTION

In preparing slabs and dimensional pieces of hard substances that form rigid building materials for transport, erection and attachment to structures, there are numerous approaches that are more or less effective. These hard substances may be, for example, slabs of slate, granite, limestone, marble, and other similar materials. The known approaches for preparing these materials generally require placement of a fastener or bolt of some sort within the rigid material. Because of the rigidity of these materials, however, there are substantial complications in penetrating the rigid material to form a hole in which to secure the fastener.

One approach is to place a vertically-canted hole in the slab and slide a bent bolt into the hole. The bent bolt protrudes from the vertically-canted hole to be perpendicular to the slab's surface. An epoxy holds the bent bolt within the canted hole. Limitations with this approach include the fact that the epoxy must hold the bolt throughout the life of the rigid material's on use the associated structure. To date, however, the epoxies that can hold the bent bolt in place have not been used for a sufficiently long period of time to verify that they will maintain their chemical composition and adhesive properties throughout the rigid material's life on the structure. Another problem with this technique is in the fact that it uses an epoxy that has constituent parts that must be mixed in precise proportions. Unless the epoxy parts are mixed in correct proportions, generally the epoxy will not properly secure the bent bolt in the vertically-canted hole.

It is also important to understand that the load bearing capacity of each one of these bent-bolt/epoxy assemblies is limited. For example, a multi-level building having a stone or granite curtain wall often uses as many as 200,000 of these bent-bolt/epoxy assemblies. Each one of these assemblies must be individual placed. With so many things that can go wrong with epoxy mixing, epoxy placement, and hole placement in a building requiring over 200,000 of these assemblies, a significant number of these assemblies could fail. Because these curtain walls are slabs of heavy granite, marble, or similar substances exposed to the public as the building's exterior, failure in even one of the 200,000 assemblies could injure a bystander. This poses an unacceptable risk associated with the use of these bent-bolt/epoxy assemblies.

Another known approach to this problem appears in U.S. Pat. No. 4,020,610 to Alexander (hereinafter Alexander). The method and system of Alexander prepare slabs of material such as granite for transportation and erection by using a cutting bit and a means for actuating the bit into the face of the slab. The means forms an arcuate slot that is widest at the bottom and centered outside the slab. The slot may be dove-tailed or an inverted T in configuration to receive the heads of a fastener by means of which the slab may be hoisted, transported, or finally secured as a curtain wall facing.

Significant problems exist with the approach of Alexander. These include the problem that the arcuate slot less than fully uses the material strength of the granite slab. This is because the holding strength of the fastener in the slot is primarily from the material above the fastener. Often this thickness is less than one-third the total thickness of the slab. Additionally, the arcuate slot is a complicated hole to form in the slab. This hole is difficult to form and, depending on the hardness or rigidity of the material, can be expensive to form in terms of both time and destruction of the cutting bit for making the arcuate slot.

Consequently, there is need for a method and system for securing an anchor to a rigid material that does not require or rely upon an epoxy to fasten the anchor into the rigid material.

There is a need for a method and system for securing an anchor to a rigid material that is simple and that does not consume an excessive amount of time in forming the penetration or hole and that does not consume cutting bits as rapidly as do known methods for making holes in which to secure the anchors.

There is a further need for a method and system for securing an anchor to a rigid material such as slate, granite, marble, glass, limestone, or other hard substances that permits the anchor to fully use the strength of the material to hold the anchor in place.

SUMMARY OF THE INVENTION

The present invention, accordingly, provides an improved anchor and a method and system for securing an anchor in a hard substance or rigid material that overcomes or reduces disadvantages and limitations associated with prior methods of handling these substances and materials and securing them on their intended structures.

According to one aspect of the invention there is provided a cutter bit for drilling a hole in a rigid material that includes a head portion for making first contact with the hard substance. The hard substance may be, for example, a material such as slate, granite, marble, or limestone. The head portion of the cutter bit attaches to a shaft portion and has an enlarged portion that has an abrasive coating that grinds the hard substance to form the drilled hole. In the preferred embodiment, the cutter bit head portion has a conical shape that is greatest at one part and that tapers to a diameter that approximately equals the diameter of the shaft portion. The shaft portion is made of a non-abrasive substance so that it removes little, if any, of the hard substance in the hole that the abrasive head portion forms. The cutter bit further includes a hollow channel within both the shaft portion and head portion that flows coolant for cooling the drilled hole and the head portion as well as removing pieces of loose hard substance from the drilled hole.

Another aspect of the method and system of the present invention is an anchor for positioning within a drilled hole formed by the above-described cutter bit. The anchor includes a bevelled head portion that is largest at one end and that tapers to a smaller end in a conical manner similar to that in which the cutter bit head portion tapers. The smaller end connects to a shank that is cylindrical and that has an engaging surface such as a threaded surface. The engaging surface permits the anchor to fasten to an attaching nut or other device on the handling platform or intended location or structure for the slab. An expanding collar loosely surrounds and slidably engages the anchor's shank. The expanding collar has an outside diameter that, before expanding, is not greater than the anchor head portion. This permits the expanding collar to fit within the drilled hole and around the anchor shank. The expanding collar has the ability to expand and conform to the shape of conical head portion. After being inserted into the drilled hole of the hard material, the expanding collar is forced over the head portion to make secure engagement with the larger bottom portion of drilled hole. This engagement securely holds the anchor in the drilled hole.

Other aspects of the present invention include, at a minimum, a process of drilling the drilled hole using the cutter bit, as well as the drilling machine used for forming the drilled hole. Additionally, the present invention includes the improved slab that results from using the cutter bit and anchor of the present invention.

The method and system of the present invention include numerous technical advantages. For example, the present invention only requires the use of a single hole that may be formed in one operation. Since only one hole is necessary for applying the anchor, the bit life for the cutter bit is longer than in that of bits used in other methods of drilling holes for securing known.

A further technical advantage of the present invention is that it uses no epoxy or other chemical or compounds to fasten the anchor within the rigid material. This removes reliance on the integrity of the epoxy as well as makes the load bearing capacity of the anchor significantly higher than that of known anchoring techniques.

Another technical advantage is that the present invention maximizes use of the material strength of the rigid material. That is, the shape of the drilled hole and the structure of the anchor make maximal use of the holding strength that the rigid material possesses and further increase the anchor's load bearing capacity.

Yet another technical advantage of the invention is that it includes a placement device to assure that the expanding collar is not forced to greater than a desired depth in the drilled hole. This provides uniformity in fastening each of the anchors in its associated drilled hole as well as protects the hard substance from damage that may occur from applying too much force to the expanding collar.

BRIEF DESCRIPTION OF THE DRAWINGS

The invention and its modes of use and advantages are best understood by reference to the following description of an illustrative embodiment when read in conjunction with the accompanying drawings, wherein:

FIG. 1 shows a system for forming a drilled hole consistent with the inventive concepts of the preferred embodiment;

FIG. 2 shows a cutter bit formed according to the preferred embodiment;

FIG. 3 shows an anchor assembly formed within the scope of preferred embodiment;

FIG. 4 illustrates a partially-drilled hole formed with the cutter bit of the preferred embodiment;

FIG. 5 shows the full depth of the drilled hole of FIG. 4;

FIGS. 7 and 8 illustrate the process of securing the anchor of the preferred embodiment in a slab of granite or other hard substance to achieve the result in the configuration that FIG. 9 shows;

DETAILED DESCRIPTION OF AN ILLUSTRATIVE EMBODIMENT

Figure 6:
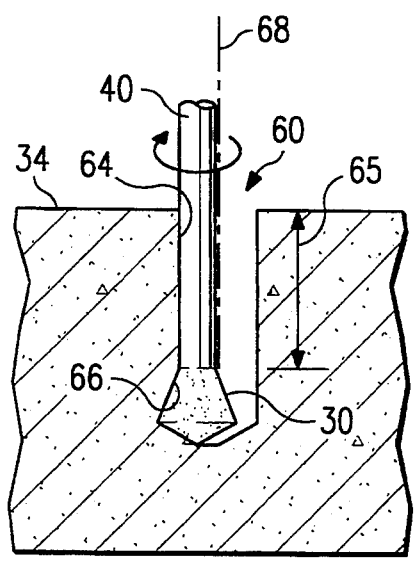
FIG. 6 illustrates the further step of forming a bevelled bottom portion of the drilled hole of FIG. 5 consistent with the inventive concepts of the preferred embodiment.

An illustrative embodiment of the present invention is best understood by referring to the FIGUREs, wherein like numerals are used for like and corresponding parts of the various drawings. In general terms, the illustrative embodiment includes a method and system for preparing slabs of hard substances for transport, erection and attachment to other structures.

According to one aspect of the invention, a drilled hole having an inverted cone-shaped bottom portion is formed into a slab of rigid material. The drilled hole permits a fastener that also has an inverted cone-shaped head to be inserted from the top of the slab to the drilled hole. The illustrative embodiment does not weaken the slab and does not require deep or long slots to be formed in the slab itself. A cutter bit forms the drilled hole and has a shaft portion and an enlarged head portion. The cutter bit penetrates to a pre-determined depth where it gyrates about the drilled hole. This gyration enlarges the innermost or deepest portion of the drilled hole. The illustrative embodiment includes a way of cooling the cutter bit as well as a stop arrangement for interrupting the advance of the cutter bit when it reaches the pre-determined depth. In the illustrative embodiment, the cutter bit shaft portion is made of a smooth material, while the head portion is made of a rough material or has cutting edges that cut the slab. The difference in construction between the head portion and the cutter bit shaft causes only the bottom portion of the drilled hole to expand in size once the drilled bit reaches the pre-determined depth. The following detailed description describes more completely how the illustrative embodiment achieves these advantageous results.

Referring to FIG. 1, drilling device 10 of the illustrative embodiment includes motor 12 that attaches to stop mechanism 14. Stop mechanism 14 slidably attaches to columns 16 and 18. Additionally, shaft 20 passes through stop mechanism 14 to attach to and be driven by the rotating part of motor 12. Intermediate device 22 attaches to stop mechanism 14. Intermediate device 22 is stationary with respect to shaft 20 and permits rotating shaft 20 to pass through and connect to cutter bit 24. Also, intermediate device 22 receives coolant through hose 26 for cooling cutter bit 24. Referring to both FIG. 1 and FIG. 2, cutter bit 24 includes hollow shaft 28 that flows coolant through cutter bit 24 and out of cutter bit head portion 30.

FIG. 1 shows that columns 16 and 18 of drilling device 10 attach at one end to stop mechanism 14 and at the other end to base 32. Base 32 contacts slab 34 and holds drilling device 10 stationary and perpendicular to slab 34. This permits drilling device 10 to place a straight perpendicular drilled hole in slab 34. Stop mechanism 14 also includes handles 36 and 38 by which an operator may hold drilling device 10 in position as base 32 maintains cutter bit 24 perpendicular to slab 34. Stop mechanism 14 is slidable over columns 16 and 18 and adjustable so that stop mechanism 14 permits cutter bit 24 to penetrate slab 34 by only a pre-determined depth.

Motor 12 may be an electric motor or a pneumatic motor. A pneumatic motor is generally preferable because of the coolant or water that passes through intermediate device 22 and out of cutter bit 24. Using a pneumatic motor avoids the problems of electrical shock that may arise if the coolant or water comes in contact with the electricity that provides power to motor 12. In one embodiment of the present invention, drilling device 10 may be secured by suction cups to slab 34. This assures that the placement of base 32 and, therefore, drilling device 10 remains constant throughout the drilling process. Alternatively, a clamp or other device may be used to maintain the position of drilling device 10 constant in relation to slab 34.

Referring to FIG. 2, cutter bit 24 includes shaft 40 and bit head portion 30. Shaft 40 is cylindrical and has a diameter less than the widest part of head portion 30. Head portion 30 includes tip 42, outermost edge 44, and conical or beveled edge 46. An alternative embodiment of the invention may include the use of small cutting blades that can cut softer material such as limestone and some softer marbles such as Travertine marble. These small cutting blades could, for example, follow the conical shape of head portion 30.

FIG. 3 shows anchor 48 of the illustrative embodiment that includes expanding collar 50 that fits around shank 52 of anchor bolt 54. Shank portion 54 has engaging threads 56. Anchor bolt 54 further includes anchor head portion 58. Expanding collar 50 includes set teeth 59 that are initially straight and parallel to shank 52 and that form around anchor head portion 58 when anchor 48 is set. (See FIG. 9, below.) Expanding collar 50 may be formed of stainless steel, brass, or other material depending on a number of design considerations. These considerations may include, for example, the resistance to deformation that may be desired for the particular application. It is also important that expanding collar 50, like the remaining portion of anchor 48, be made of a corrosion resistant material. FIGS. 4 through 9, below, described use of cutter bit 24 and placement of anchor 48 according to the illustrative embodiment.

FIG. 4 illustrates the initial phase of forming drilled hole 60 according to the concepts of the invention. For example, as cutter bit 24 rotates and is driven into slab 34, drilled hole 60 forms. Drilled hole 60 has a diameter approximately equal to the diameter of bit head portion 30. Since shaft portion 40 has a smaller diameter than does bit head portion 30, gap 62 between shaft 40 and sidewall 64 results.

FIG. 5 shows the penetration of cutter bit 24 in drilled hole 60 to a pre-determined depth. This depth may be determined by the adjustment of stop mechanism 14. Note that it may not always be necessary to have coolant flow through cutter bit 24. For example, when forming drilled hole 60 in a relatively soft material such as limestone, drilled hole 60 generally forms more rapidly and with less heat generation than it does in other hard substances. Consequently, the temperatures of drilled hole 60 and cutter bit 24 are not excessive in limestone. On the other hand, when drilling granite, the temperatures can be excessive. Also, the removed portions of granite of drilled hole 60 can themselves be abrasive to sidewall 64. This makes the coolant flow essential when forming drilled hole 60 in granite.

FIG. 6 shows initial formation of the bevelled bottom portion of drilled hole 60. Once cutter bit 24 reaches its pre-determined depth, the next step of the method of the illustrative embodiment is to align shaft 40 with sidewall 64 of drilled hole 60 so that head portion 30 contacts and places pressure on bottom portion 66 of sidewall 64. Shaft 40, in the illustrative embodiment, has a smooth, non-abrasive surface, but head portion 30 has a rough, abrasive surface. For example, head portion 30 may be formed of a diamond-encrusted steel. Since shaft 40 is smooth and generally non-abrasive, it does not further cut or grind sidewall 50. This keeps upper portion 65 of drilled hole 60 essentially cylindrical. On the other hand, since bit head portion 30 is rough and abrasive, its rotation forms the larger bottom portion 66. The method of the illustrative embodiment is to make bottom portion 66 symmetric about the center axis 68 of drilled hole 60. Because of the slanted or bevelled edge 46 of cutter bit head portion 30, bottom portion 66 also has a bevelled sidewall. Therefore, drilled hole 60 includes a cylindrical portion 65 that sidewall 64 defines and bevelled bottom portion 66.

To assure that shaft 40 does not further deteriorate sidewall 64 and further enlarge the cylindrical diameter of upper portion 65, a template or other device may be used at the surface of slab 34 to restrict lateral movement of cutter bit 24 to no greater than the template's diameter. This may be particularly advantageous in the event that slab 34 is of a relatively softer material such as limestone. If, on the other hand, shaft 40 of cutter bit 24 is of a very smooth steel or similarly hard and strong material and the material itself is hard, a template may not be necessary.

FIG. 7 shows a partially cut-away drawing of anchor 48 and placement device 70 in drilled hole 60. As is apparent, the anchor head portion 58 diameter is less than the diameter of upper portion 65 of drilled hole 60. Therefore, it slides into drilled hole 60 all the way to the depth of bottom portion 66. Expanding collar 50 slides over threaded shank 52 and into drilled hole 60, but no deeper than to the point at which it contacts anchor head portion 58. When inserted into drilled hole 60, the rigidity of expanding collar 48 prevents it from moving down to and surrounding bevelled head portion 58. In the initial installation, therefore, expanding collar 50 fits loosely around shank 52.

Placement device 70 includes placement head 72 that attaches to shaft 74. Shaft 74 includes exterior threads 76 around which stop plate 78 engages. Stop plate 78 includes interior threads 80 and securing bolt 82. Securing bolt 82 screws into securing hole 84 to secure or lock stop plate 78 in position. Instead of using securing bolt 82 in securing hole 84, a clamp or finger lever arrangement may be used to fix stop plate 78 in its position along shaft 74 of placement device 60. Alternatively, the securing mechanism for placement device 70 may be a double nut instead of a securing bolt. Placement device shaft 74 has an outside diameter smaller than the diameter of drilled hole 60 but larger than the outer diameter of anchor shank 52. This permits shaft 76 to fit around shank 52 within drilled hole 60 to engage or contact expanding collar 50. The distance 86 of stop plate 78 from slab 34 should approximate the desired travel distance of expanding collar 50 in drilled hole 60. FIG. 8, below, explains the reasons for this distance.

FIG. 8 shows the use of placement device 70. The arrows in FIG. 8 indicate applying an impact force to placement head 72 of placement device 70. This force further inserts placement device 70 in drilled hole 48, but only to the depth that bracket 86 of FIG. 7 indicates. This height is equivalent to the depth that expanding collar 50 is to be inserted into bottom portion 66 of drilled hole 60. In other words, the depth to which placement device 70 enters drilled hole 60 is determined by the distance of stop plate 78 from slab 34.

Forcing stop plate 78 to contact slab 34 by tapping placement head 72 causes expanding collar 50 to expand around anchor head portion 58. This operation secures anchor 48 in drilled hole 60 and prevents its subsequent removal. The shape and orientation of anchor head portion 58 in conjunction with expanding collar 50 in bottom portion 66 permanently sets anchor 48 in drilled hole 60. Placement device 70 also assures that expanding collar 58 will not be inserted so as to forcefully impact bottom portion 66 of drilled hole 60. This avoids stresses on the opposite side of slab 34 from which anchor 48 is inserted.

After forcing expanding collar 50 around anchor head portion 58 within bottom portion 66, anchor 48 cannot be extracted without overcoming the material strength of slab 34. The greater the force applied to remove anchor 48 from drilled hole 60, the greater is the force that keeps anchor 48 in drilled hole 60. This is due to the counteracting force that the material strength of slab 34 produces. The counteracting force that the slab 34 material strength produces radiates from bottom portion 66 in a uniform distribution that no known anchoring system for rigid materials achieves as successfully as does the illustrative embodiment.

In the illustrative embodiment, the angles of bevelled edge 46 of cutter bit 24 and of anchor head portion 58 produce approximately an $\frac{1}{8}''$ increase in diameter for every $\frac{1}{4}''$ increase in length or, equivalently, a 12.5% increase in diameter per inch increase in length. Other angles for cutter bit 24 and anchor head portion may be desirable for meeting different design considerations. It should, however, be noted that though this degree of diameter increase is not required to practice the invention, the greater the angle the more will be the force that radiates in the direction of the slab 34 surface. As the angle decreases, the force that anchor 48 produces radiates outward and into slab 34. On the other hand, the angle of anchor head portion 58 and, therefore, expanding collar 50 must be sufficiently large to engage anchor 48 firmly in drilled hole 60 and resist any outward force that tends to extract anchor 48 from slab 34.

Figure 9:
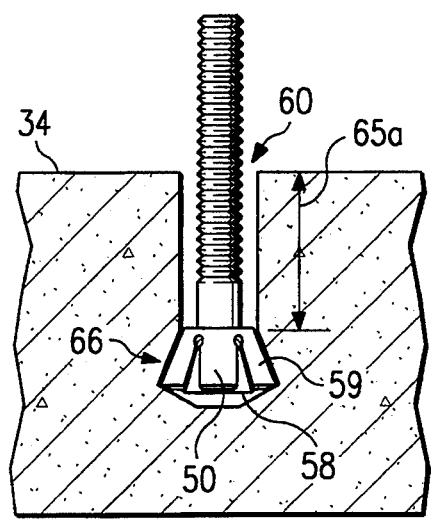
FIG. 9 illustrates final installation of the anchor of the preferred embodiment within the drilled hole of FIG. 6.
Figure 10:
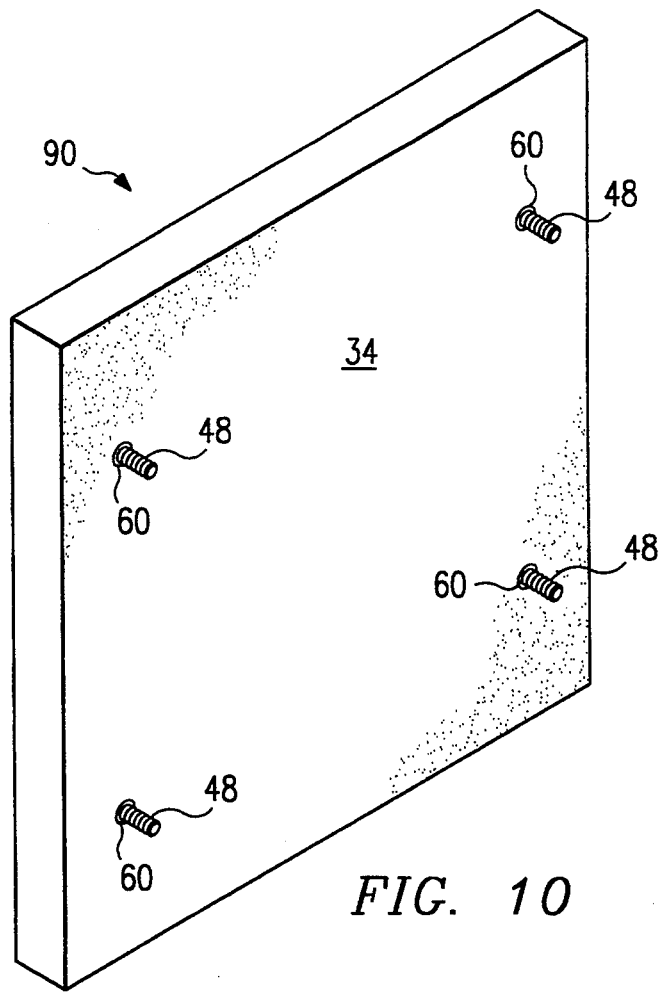
FIG. 10 shows a slab of granite or other rigid material formed consistent with the concepts of the preferred embodiment.

FIG. 9 shows the final installation of anchor 48 mounted in slab 34. FIG. 10 shows slab 34 with a set of four anchors 48 installed according to the inventive concepts of the preferred embodiment to form improved slab 90.

As can be seen from the above description, the operation of the preferred embodiment is simple and does not require the levels of hole placement and anchor engagement precision that certain known anchor placement techniques require. Although it is generally best to orient drilled hole 60 and anchor 48 perpendicular to the exterior surface of slab 34, the preferred embodiment is more forgiving than are other known methods and devices that require exact angles in the placement of their respective anchoring device. Also, anchor 48 of the preferred embodiment may be installed in the field. This is in stark contrast to most known methods of installing anchors for curtain walls and other similar purposes. Because of its simple installation method and the requirement of only one single drilled hole, the preferred embodiment is less time-consuming to perform, and cutter bit 24 can form more drilled holes than is generally possible with other methods of anchor installation.

Another technical advantage of the method and system of the preferred embodiment is that no epoxy or other substance is necessary to install anchor 48 in drilled hole 60. Not only does this avoid the risk of improper epoxy mixing or placement, but also the method of the preferred embodiment has a much higher load bearing capacity than do systems that use epoxy or other chemical substances to secure an anchor. Because the load bearing capacity of anchor 48 is approximately twice that of many conventional known anchors, the number of anchors necessary to securing a slab such as slab 34 only needs to be half of that required for conventional anchors.

OPERATION

The operation of method and system of the illustrative embodiment is apparent from the above description, however, for completeness the following is a description of forming drilled hole 60 together with the secure placement of anchor 48. The first step in the process of the illustrative embodiment is to secure or otherwise make steady drilling device 10 on slab 34 (FIG. 1). Once steady, drilling device 10 will be used to rapidly rotate cutter bit 24 at a sufficiently high speed to drill a hole into the exterior surface of slab 34. During this operation and assuming that heat generation and other material considerations require it, coolant flows through hose 26 and intermediate device 22 and out of cutter bit 24. As cutter bit 24 rotates, it is forced into slab 34 to form drilled hole 60 (FIG. 4). Based on the pre-determined setting of stop mechanism 14, cutter bit 24 will reach the appropriate depth for drilled hole 60 (FIG. 5). Next, cutter bit 24 is moved laterally while rapidly rotating to form bottom portion 66 of drilled hole 68 (FIG. 6).

Once a completely symmetric bottom portion 66 is formed, cutter bit 24 is removed from drilled hole 60. Then, anchor 48 is placed in drilled hole 60 (FIG. 7). Placement device 70 is then fit in drilled hole 60 and around anchor 48 to contact expanding collar 50 (FIG. 7). Next, using a rubber mallet or other forcing device, placement device 70 is tapped to cause expanding collar 50 to form around anchor head portion 58 (FIG. 8). Anchor 48 is now secure in drilled hole 60 with expanding collar 50 between anchor head portion 58 and the inner wall of bottom portion 66. Anchor 48 may be placed at any desired point in slab 34 to form an anchored slab 90 (FIG. 10).

In summary, there are shown in the illustrative embodiment numerous aspects of the method and system of the present invention. These aspects include a cutter bit 24 for drilling a hole in a hard substance such as slab 34 and anchor 48 that the illustrative embodiment secures in drilled hole 60. Other aspects of the invention include the process of drilling drilled hole 60 to accommodate anchor 48, drilling device 10 that holds and uses cutter bit 24 to form drilled hole 48, as well as the final structure 90 that appears in FIG. 10.

Although the invention has been described with reference to the above-specified embodiments, this description is not meant to be construed in a limiting sense. Various modifications of the disclosed embodiment, as well as alternative embodiments of the invention will become apparent to persons skilled in the art upon reference to the above description. It is, therefore, contemplated that the appended claims will cover such modifications that fall within the true scope of the invention.

What is claimed is:

1. A method for forming a drilled hole having a sidewall and a bevelled bottom portion in a hard substance for securing an anchor in the hard substance, the method comprising the steps of:

(1) forming a cylindrical hole having a cylindrical sidewall and a cylindrical bottom portion in the hard substance using a cutter bit, said cutter bit having an essentially non-abrasive cylindrical shaft portion and an abrasive bevelled head portion, said cylindrical hole being formed to a predetermined depth;

(2) moving said cutter bit laterally off the center axis of said cylindrical hole by a pre-determined amount such that said shaft non-abrasively contacts the sidewall of the cylindrical hole while the abrasive bevelled head portion continues to drill the cylindrical hole; and (3) laterally moving the cutter bit at the pre-determined depth to enlarge the cylindrical bottom portion of the cylindrical hole and form a bevelled bottom portion having a bevelled sidewall that essentially follows the form of the abrasive bevelled head portion to form the drilled hole for receiving the anchor.

2. The method of claim 1, further comprising the step of forming the bevelled bottom portion into a partially conical shape, the partially conical shape essentially following the shape of the abrasive bevelled head portion.

3. The method of claim 1, further comprising the step of flowing coolant through said cutter bit for cooling said drilled hole as said cutter bit forms said drilled hole.

4. The method of claim 1, further comprising the step of flowing coolant through said cutter bit and said drill hole for removing pieces of the hard substance as said cutter bit forms the drilled hole.

* * * * *